United States Patent
Balakrishnan et al.

(10) Patent No.: US 11,043,890 B2
(45) Date of Patent: Jun. 22, 2021

(54) CONTROLLER WITH FREQUENCY TO ON-TIME CONVERTER

(71) Applicant: Power Integrations, Inc., San Jose, CA (US)

(72) Inventors: Balu Balakrishnan, Saratoga, CA (US); Tiziano Pastore, Los Gatos, CA (US); Sundaresan Sundararaj, Union City, CA (US)

(73) Assignee: Power Integrations, Inc., San Jose, CA (US)

( * ) Notice: Subject to any disclaimer, the term of this patent is extended or adjusted under 35 U.S.C. 154(b) by 0 days.

(21) Appl. No.: 16/260,798

(22) Filed: Jan. 29, 2019

(65) Prior Publication Data

US 2019/0157966 A1    May 23, 2019

Related U.S. Application Data

(63) Continuation of application No. 15/821,479, filed on Nov. 22, 2017, now Pat. No. 10,243,442.

(51) Int. Cl.
*H02M 1/08* (2006.01)
*H02M 3/335* (2006.01)
(Continued)

(52) U.S. Cl.
CPC .............. *H02M 1/08* (2013.01); *H02M 1/42* (2013.01); *H02M 3/33523* (2013.01); *H02M 3/33592* (2013.01); *H02M 2001/0025* (2013.01)

(58) Field of Classification Search
CPC ......... H02M 3/156–158; H02M 3/335; H02M 3/33507; H02M 3/33515; H02M 3/33523;
(Continued)

(56) References Cited

U.S. PATENT DOCUMENTS 4,095,165 A    6/1978  Boros
8,098,503 B2 *  1/2012  Gaknoki ........... H02M 3/33507
                                                363/21.17
(Continued)

FOREIGN PATENT DOCUMENTS

CN    103151934 B    9/2015
EP    2360821 A2     8/2011
EP    2947761 A1    11/2015

OTHER PUBLICATIONS

Extended European Search Report dated Apr. 5, 2019, for European Application No. 18206622.5 filed Nov. 16, 2018, 8 pages.
(Continued)

*Primary Examiner* — Yemane Mehari
(74) *Attorney, Agent, or Firm* — Power Integrations, Inc.

(57) ABSTRACT

A controller for use in a power converter includes a secondary controller coupled to receive a feedback signal representative of an output of the power converter to generate d a request signal. A primary controller is coupled to receive the request signal to generate a primary drive signal. The primary drive signal is coupled to control switching of a power switch to control a transfer of energy from the input to the output of the power converter. A frequency to on-time converter included in the primary controller is coupled to receive the request signal. The frequency to on-time converter is coupled to control the duration of on-time pulses included in the primary drive signal in response to a period of the request signal.

18 Claims, 6 Drawing Sheets

(51) Int. Cl.
H02M 1/42 (2007.01)
H02M 1/00 (2006.01)

(58) Field of Classification Search
CPC ...... H02M 3/33592; H02M 1/08; H02M 1/14; H02M 1/42; H02M 2001/0009; H02M 2001/0025; Y02B 70/1475
USPC .......................................... 363/21.01–21.18
See application file for complete search history.

(56) References Cited

U.S. PATENT DOCUMENTS

| | | | |
|---|---|---|---|
| 9,071,152 B2 | 6/2015 | Morong et al. | |
| 9,246,392 B2* | 1/2016 | Balakrishnan | H02M 3/335 |
| 9,374,011 B2* | 6/2016 | Liu | H02M 1/14 |
| 9,866,115 B2* | 1/2018 | Jing | H02M 1/15 |
| 10,186,976 B2* | 1/2019 | Duvnjak | H02M 3/33592 |
| 2008/0036430 A1 | 2/2008 | Li et al. | |
| 2008/0084713 A1* | 4/2008 | Baurle | H02M 3/33515 363/21.01 |
| 2010/0302811 A1* | 12/2010 | Saint-Pierre | H02M 3/33515 363/21.01 |
| 2011/0193494 A1* | 8/2011 | Gaknoki | H05B 45/37 315/297 |
| 2013/0027990 A1* | 1/2013 | Baurle | H02M 3/33507 363/21.17 |
| 2013/0033902 A1* | 2/2013 | Zhang | H02M 3/33523 363/15 |
| 2013/0083566 A1* | 4/2013 | Gaknoki | H02M 3/33515 363/21.17 |
| 2014/0204625 A1* | 7/2014 | Liu | H02M 3/33592 363/21.13 |
| 2014/0254212 A1 | 9/2014 | Matthews et al. | |

OTHER PUBLICATIONS

EP Article 94 Examination Report dated Jan. 2, 2020 for European Patent Application No. 18 206 622.5-1201; 44 pages in all.
India Examination Report dated Jun. 29, 2020 in India Patent Application No. 201814042140, 5 pages in all.
EP Summons to Attend Oral Proceedings Pursuant to Rule 115(1) EPC issued Jan. 29, 2021 in EP Application 18206622.5

* cited by examiner

CONTROLLER WITH FREQUENCY TO ON-TIME CONVERTER

CROSS-REFERENCE TO RELATED APPLICATIONS

This application is a continuation of U.S. patent application Ser. No. 15/821,479, filed on Nov. 22, 2017, now U.S. patent application Ser. No. 15/821,479 is hereby incorporated by reference.

BACKGROUND INFORMATION

Field of the Disclosure

The present invention relates generally to power converters, and more specifically to controllers for switched mode power converters.

Background

Electronic devices use power to operate. Switched mode power converters are commonly used due to their high efficiency, small size and low weight to power many of today's electronics. Conventional wall sockets provide a high voltage alternating current. In a switching power converter, a high voltage alternating current (ac) input is converted to provide a well regulated direct current (dc) output through an energy transfer element. In operation, a switch is utilized to provide the desired output by varying the duty cycle (typically the ratio of the ON time of the switch to the total switching period), varying the switching frequency, or varying the number of pulses per unit time of the switch in a switched mode power converter.

The switched mode power converter also includes a controller. Output regulation may be achieved by sensing and controlling the output in a closed loop. The controller may receive a signal representative of the output, and the controller varies one or more parameters in response to the signal to regulate the output to a desired quantity. Various modes of control may be utilized such as pulse width modulation (PWM) control, pulse frequency modulation (PFM) control, or ON/OFF control.

Properties, such as efficiency, size, weight, and cost are usually taken into account when designing a power converter and controller. Switched mode power converters and controllers may also be designed to meet standards set by regulatory agencies. For example, wall sockets provide an ac voltage, which has a waveform conforming to standards of magnitude, frequency, and harmonic content. However, the characteristics of the current waveform drawn from the wall socket are determined by the power converter, which receives the ac voltage. Regulatory agencies and/or power utility companies may set limits on magnitudes of specific frequency components of an ac current or total harmonic content (usually denoted by THD or Total Harmonic Distortion) and/or limit the ratio of real power to apparent power drawn (referred to as Power Factor) from the wall socket. Power Factor, Total Harmonic Distortion (THD) and spectral content may be used as measurements to determine if a power converter is meeting the standards set by regulatory agencies. If the current waveform drawn from the wall socket matches in shape with the voltage waveform, which is true for linear loads, then the Power Factor would be unity. In addition, if the waveforms are sinusoidal, then there will be no harmonics, which means that there is no spectral content and the THD would be 0%. In the real world, due to the non-linear nature of the loading presented by the switched mode converters to the wall socket, the Power Factor is usually less than unity and there is usually some content at various harmonic frequencies resulting in non-zero THD.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

Figure 1A:
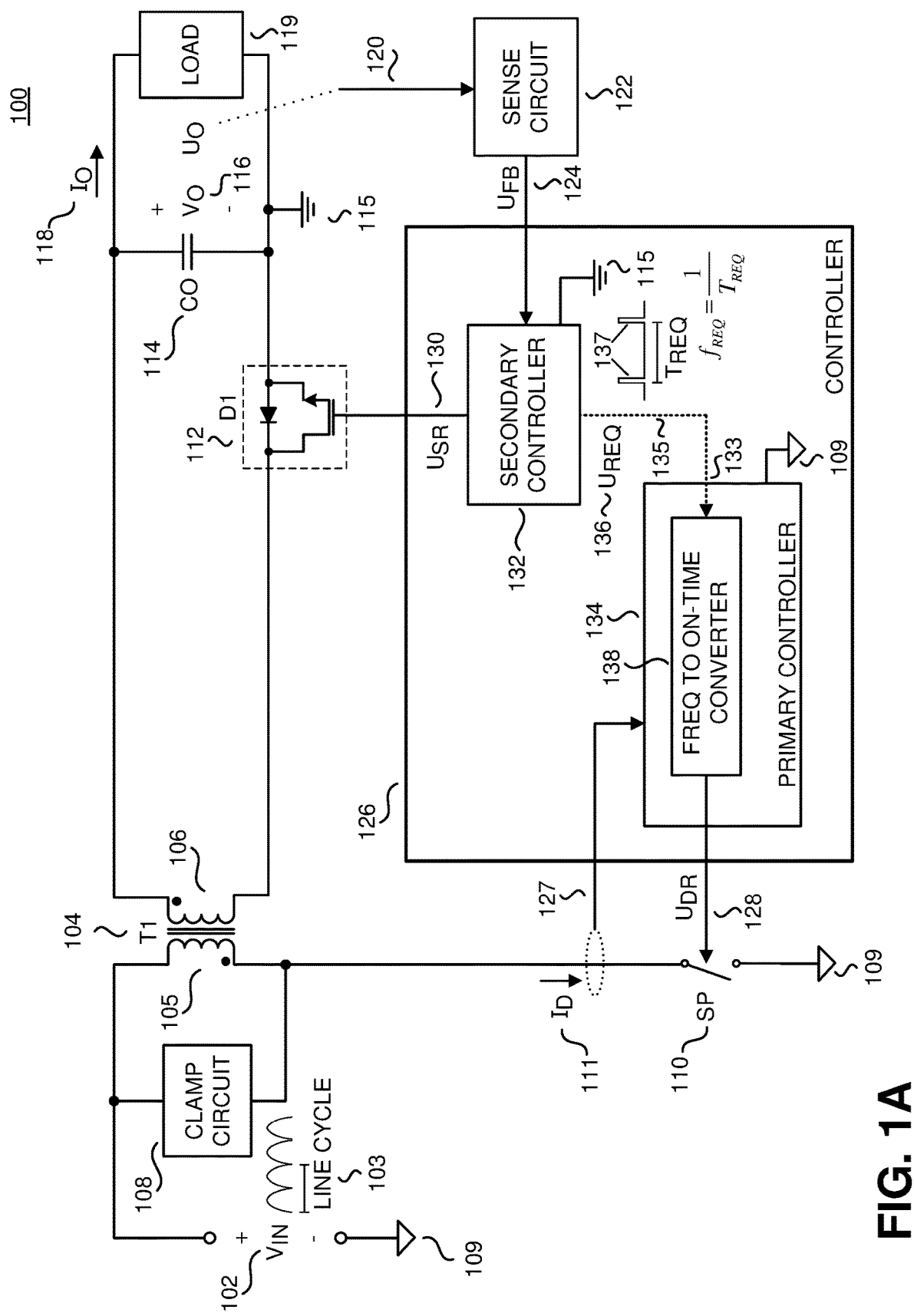
FIG. 1A is a schematic illustrating an example of a power converter and controller with a frequency to on-time converter in accordance with an embodiment of the disclosure.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

In the following description, numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Reference throughout this specification to "one embodiment", "an embodiment", "one example" or "an example" means that a particular feature, structure or characteristic described in connection with the embodiment or example is included in at least one embodiment of the present invention. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or subcombinations in one or more embodiments or examples. Particular features, structures or characteristics may be included in an integrated circuit, an electronic circuit, a combinational logic circuit, or other suitable components that provide the described functionality. In addition, it is appreciated that the figures provided herewith are for explanation purposes to persons ordinarily skilled in the art and that the drawings are not necessarily drawn to scale.

Low Power Factor and excessive harmonic content causes underutilization of the power infrastructure and also presents other problems such as radiation, excess neutral current, etc. Consequently, regulatory agencies and power utility companies have an incentive to set limits on these parameters. To achieve near unity power factor correction (PFC), the controller controls the power switch to generally shape the input current waveform of the power converter as closely to the input voltage waveform of the power converter. One technique that may be used to achieve near unity PFC is to utilize fixed on-time, fixed frequency control, where the on-time and the switching frequency of the power switch is set to a constant value. However, fixed on-time, fixed-frequency control may produce significant output voltage ripple at the output of the power converter due to over delivering power at the peak of the input voltage, and under delivering power at near zero values of the input voltage.

As will be discussed, examples in accordance with the present disclosure provide a power converter control scheme where the duration of the on-time of the power switch is determined by the switching frequency of the power switch, also referred to as frequency to on-time conversion. The controller may receive a request signal with request events to turn on the power switch. The frequency of request events in the request signal sets the switching frequency of the power switch and determines the on-time of the power switch. The greater the frequency of the request signal, the longer the on-time of the power switch. The frequency to on-time conversion may be implemented alongside variable on-time, variable frequency control or with fixed-frequency control. The frequency and the on-time may be varied over a line cycle of the input voltage to reduce output voltage ripple. Although both the frequency and the on-time are varied, the frequency and on-time are not varied enough to affect PFC significantly.

To illustrate, FIG. 1A is a schematic illustrating an example of a power converter 100 and controller 126 with a frequency to on-time converter 138 in accordance with an embodiment of the disclosure. In one example, the power converter 100 provides output power to the load 119 from an unregulated input voltage $V_{IN}$ 102, which in one example is a rectified and filtered ac line voltage or a dc input voltage. In the depicted example, the input voltage $V_{IN}$ 102 is a full wave rectified voltage having a line cycle 103, which includes two half line cycles of an ac input voltage waveform. In one example, the ac input voltage waveform may be received from a varying ac line, and the power converter 100 is a power factor corrected (PFC) power converter. The input voltage $V_{IN}$ 102 is coupled to the energy transfer element 104. In some embodiments, the energy transfer element 104 may be a coupled inductor, transformer, or an inductor. The example energy transfer element 104 shown in FIG. 1A includes two windings, a primary winding 105 and a secondary winding 106. However, in other examples, the energy transfer element 104 may have more than or less than two windings. Coupled across the primary winding 105 is the clamp circuit 108, which limits the maximum voltage across a power switch SP 110 that is coupled to the primary winding 105 and an input return 109 as shown. A switch current $I_D$ 111 is conducted through power switch SP 110 when power switch SP 110 is turned on.

Figure 1B:
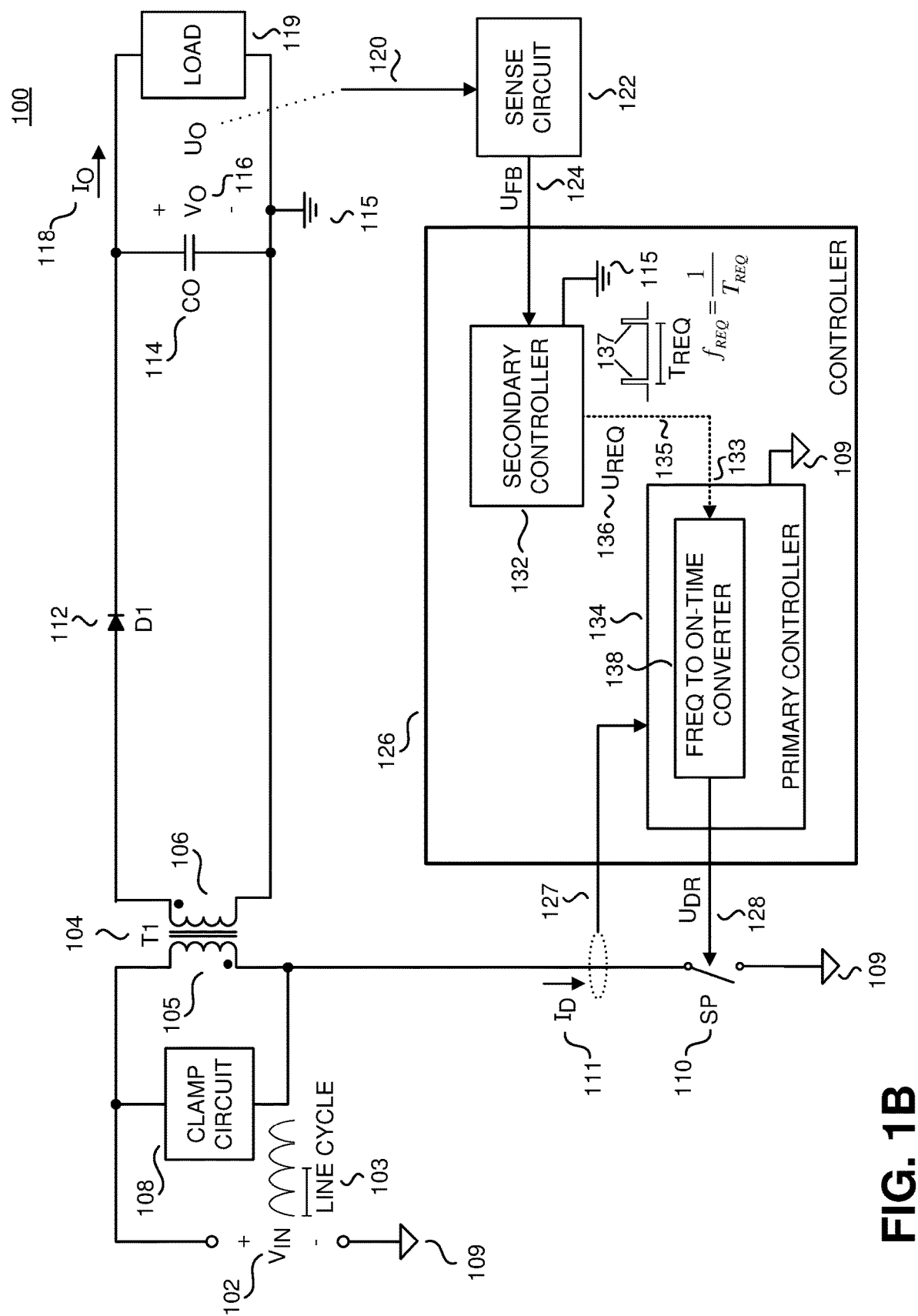
FIG. 1B is a schematic illustrating another example of a power converter and controller with a frequency to on-time converter in accordance with an embodiment of the disclosure.

The secondary winding 106 is coupled to the output rectifier D1 112, which in the depicted example is a synchronous rectifier that is exemplified as a transistor. However, in another example, it is appreciated that the output rectifier D1 112 may be substituted with a diode (as shown in FIG. 1B). An output capacitor CO 120 is shown as being coupled to the output rectifier D1 112 and output return 115. As will be discussed, the power converter 100 further includes a controller 126 to regulate the output of power converter 100. In the example, the output of power converter 100 is exemplified as output quantity $U_O$ 120. In general, the output quantity $U_O$ 120 is an output voltage $V_O$ 116, an output current $I_O$ 124, or a combination of the two. A sense circuit 126 is coupled to sense the output quantity $U_O$ 120 and to provide the feedback signal $U_{FB}$ 124, which is representative of the output quantity $U_O$ 120.

In the illustrated example, the power converter 100 is shown as having a flyback topology. It is appreciated that other known topologies and configurations of power converters may also benefit from the teachings of the present disclosure. In the depicted example, the input of power converter 100 is galvanically isolated from the output of power converter 100, such that input return 109 is galvanically isolated from output return 115. Since the input and output of power converter 100 are galvanically isolated, there is no direct current (dc) path across the isolation barrier of energy transfer element T1 104, or between primary winding 105 and secondary winding 106, or between input return 109 and output return 115.

As show in the depicted example, power converter 100 includes controller 126, which includes a secondary controller 132 coupled to receive the feedback signal $U_{FB}$ 124 that is representative of the output of the power converter 100. The secondary controller 132 is coupled to generate a request signal $U_{REQ}$ 136 in response to the feedback signal $U_{FB}$ 124. The secondary controller 132 is also coupled to generate a secondary drive signal $U_{SR}$ 130 to control switching of the synchronous rectifier D1 112 that is coupled to the output of the power converter 100. The secondary drive signal $U_{SR}$ 130 may be a rectangular pulse waveform with varying lengths of logic high and logic low sections. Logic high sections may correspond with turning on the synchronous rectifier D1 112 while logic low sections may correspond with turning off the synchronous rectifier D1 112. It should be appreciated that the secondary controller 132 may generate other signals, which are not shown. In one example, the request signal $U_{REQ}$ 136 includes request events 137 that are generated in response to the feedback signal $U_{FB}$ 124 and indicate that the primary controller 134 should turn on the power switch SP 110. The request signal $U_{REQ}$ 136 may be a rectangular pulse waveform which pulses to a logic high value and quickly returns to a logic low value. The logic high pulses may be referred to as request events 137. The frequency of the request events 137 may be responsive to the feedback signal $U_{FB}$ 124. A primary controller 134 includes an input 133 that is coupled to receive the request signal $U_{REQ}$ 136 from the secondary controller 132 through a communication link 135. In the example, the primary controller 134 is coupled to turn on the power switch SP 110 in response to the request events 137. In particular, the primary controller 134 is coupled to generate a primary drive signal $U_{DR}$ 128 in response to the request signal $U_{REQ}$ 136, which is coupled to control switching of the power switch SP 110 that is coupled to input return 109 to control a transfer of energy from the input of the power converter 100 to the output of the power converter 100 through energy transfer element T1 104. Further, the controller 126 controls the power switch SP 110 and the synchronous rectifier D1 112 such that both switches are not on at the same time.

In one example, the primary controller 134 is galvanically isolated from the secondary controller 132, as exemplified with primary controller 134 referenced to input ground 109 and with secondary controller 132 referenced to output ground 115. Accordingly, in one example, the communication link 135 through which primary controller 134 is coupled to receive the request signal $U_{REQ}$ 136 from the secondary controller 132 maintains the galvanic isolation between the primary controller 134 and the secondary controller 132. Controller 126 may be implemented as a monolithic integrated circuit or may be implemented with discrete electrical components or a combination of discrete and integrated components. Further, controller 126 and power switch SP 110 could form part of an integrated circuit that is manufactured as either a hybrid or monolithic integrated circuit. The controller 126 may also be implemented as one or more integrated circuits. In one example, it is appreciated that the primary controller may be included in a first semiconductor die, and that the secondary controller may be included in a second semiconductor die, such that the first semiconductor die is separate from the second semiconductor die. In one example, the first semiconductor die and the second semiconductor die may be included in a single package. In one example, the communication link 135 may be a transformer or coupled inductor built into the lead frame which supports the primary and secondary controllers 132, 134. However, the controller 126 may also be implemented as one or more packages, which include the one or more integrated circuits.

In the example shown, a frequency to on-time converter 138 is included in the primary controller 134, and is coupled to the input 133 to receive the request signal $U_{REQ}$ 136 to generate the primary drive signal $U_{DR}$ 128 to control the transfer of energy from the input of the power converter 100 to the output of the power converter 100. In one example, the primary drive signal $U_{DR}$ 128 is a rectangular pulse waveform with varying lengths of logic high sections (referred to as pulses) and logic low sections. In one example, a logic high pulse in the primary drive signal $U_{DR}$ 128 turns on the power switch SP 110. As such, the duration of the pulse may be referred to as the on-time of the power switch SP 110. As will be discussed, the frequency to on-time converter 138 is coupled to control the duration of pulses included in the primary drive signal $U_{DR}$ 128 in response to a period ($T_{REQ}$) or a frequency ($f_{REQ}$) of the request signal $U_{REQ}$ 136 in accordance with the teachings of the present invention. Indeed, the frequency ($f_{REQ}$) of the request events 137 in the request signal $U_{REQ}$ 136 is equal to the reciprocal of the period ($T_{REQ}$) of the request signal $U_{REQ}$ 136. In one example, the duration of pulses included in the primary drive signal $U_{DR}$ 128 may be substantially fixed or variable over a line cycle 103 of an input voltage 102 coupled to be received by the input of the power converter. For example, the frequency ($f_{REQ}$) of the request signal $U_{REQ}$ 136 (and ergo the duration of pulses in the primary drive signal $U_{DR}$ 128) may vary over a line cycle 103 of the input voltage 102 to reduce output ripple. In another example, the frequency to on-time converter 138 may be included in the secondary controller 132 and the drive signal $U_{DR}$ 128 may be transmitted across the communication link 135. An optocoupler may be used for the communication link 135 to transmit the drive signal $U_{DR}$ 128. In another example, the frequency to on-time converter 138 may output a signal to the primary controller 134 across to communication link 135 to turn on and turn-off the power switch 110.

FIG. 1B is a schematic illustrating another example of a power converter 100 and controller 126 with a frequency to on-time converter 138 in accordance with an embodiment of the disclosure. It should be appreciated that similarly named and numbered elements are coupled and function as described above. Further, FIG. 1B shares many similarities with FIG. 1A, however, the output rectifier D1 112 is shown as a diode rather than a synchronous rectifier. As such, the secondary controller 132 does not generate a secondary drive signal to control the output rectifier D1 112. In the example shown, the output rectifier D1 112 is coupled to the high side of the secondary winding 106.

Figure 2:
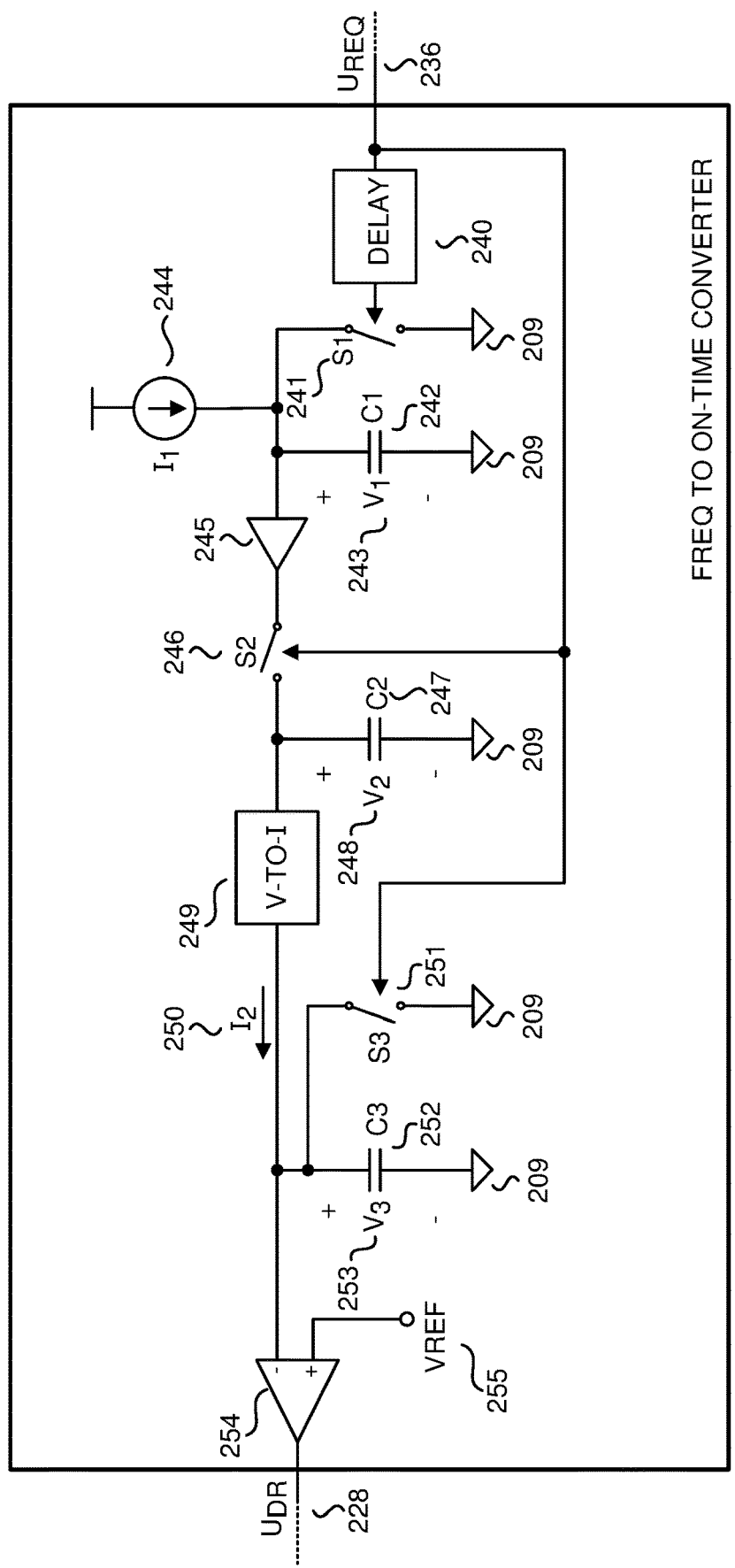
FIG. 2 is a schematic illustrating an example of a frequency to on-time converter of FIG. 1A or 1B in accordance with an embodiment of the disclosure.

FIG. 2 is a schematic illustrating an example of a frequency to on-time converter 238 in accordance with the teachings of the present invention. In one example, it is appreciated that frequency to on-time converter 238 of FIG. 2 may be an example of the frequency to on-time converter 138 of FIG. 1, and that similarly named or numbered elements described above may be coupled and function similarly below. As shown in the depicted example, the frequency to on-time converter 238 of FIG. 2 includes a first integrator coupled to generate a first voltage $V_1$ 243 in response to the request signal $U_{REQ}$ 236. In the depicted example, the first integrator includes a first current source 244 coupled to provide a current $I_1$ to charge a first capacitor C1 242, and a first switch S1 241 coupled to discharge and reset the first capacitor C1 242 in response to a request event (e.g., request event 137) included in the request signal $U_{REQ}$ 236. In one example, the first switch S1 241 is coupled to be controlled by the request signal $U_{REQ}$ 236 through a delay circuit 240.

A sample and hold circuit is coupled to the first integrator, and coupled to receive the request signal $U_{REQ}$ 236 to generate a second voltage $V_2$ 248 in response to the first voltage $V_1$ 243 and the request signal $U_{REQ}$ 236. In the depicted example, the sample and hold circuit includes a buffer 245 coupled to receive the first voltage $V_1$ 243 from the first integrator to generate the second voltage $V_2$ 248, a second capacitor C2 247 coupled to hold the second voltage $V_2$ 248 that is output from the buffer 245, and a second switch S2 246 coupled between the second capacitor C2 247 and the buffer 245. The second switch S2 is coupled to cause the second capacitor C2 to sample the second voltage $V_2$ 248 output from the buffer 245 in response to the request event 137 included in the request signal $U_{REQ}$ 246. A voltage-controlled current source 249 is coupled to the sample and hold circuit to generate a voltage-controlled current $I_2$ 250 in response to the second voltage $V_2$ 248.

A second integrator is coupled to the voltage-controlled current source 249 and coupled to receive the request signal $U_{REQ}$ 236 to generate a third voltage $V_3$ 253 in response to the voltage-controlled current $I_2$ 250. In the depicted example, the second integrator includes a third capacitor C3 252 coupled to receive the voltage-controlled current $I_2$ 250 from the voltage-controlled current source 249, and a third switch S3 251 coupled to discharge and reset the third capacitor C3 252 in response to a request event 137 included in the request signal $U_{REQ}$ 236. A comparator 254 is coupled to the second integrator to compare the third voltage $V_3$ 253 and a reference voltage VREF 255 to generate the drive signal $U_{DR}$ 228.

Figure 3:
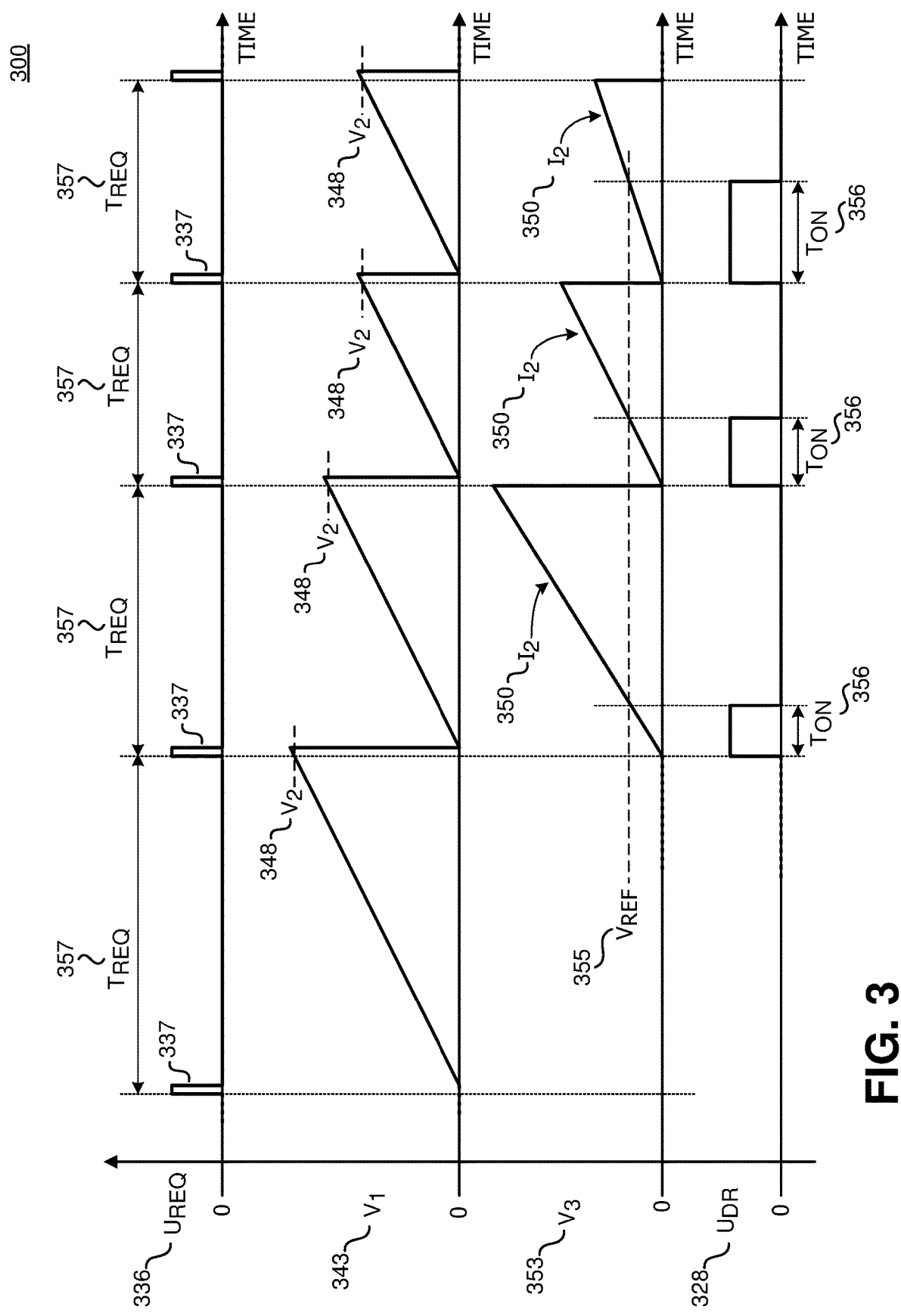
FIG. 3 is a timing diagram illustrating various example waveforms from FIG. 2 in accordance with an embodiment of the disclosure.

FIG. 3 is a timing diagram 300 illustrating various example waveforms in accordance with an embodiment of the disclosure. In one example, it is appreciated that waveforms of FIG. 3 may correspond to waveforms appearing in FIGS. 1A-2, and that similarly named or numbered elements described above may be coupled and function similarly below. As shown in the example depicted in FIG. 3, a request signal $U_{REQ}$ 336 includes request events 337, having a period of $T_{REQ}$ 357, and the frequency $f_{REQ}$ of request events 337 is equal to $1/T_{REQ}$. In the depicted example, the first voltage $V_1$ 343 of FIG. 3 corresponds to the first voltage $V_1$ 243 generated across first capacitor C1 242 of FIG. 2, the third voltage $V_3$ 353 of FIG. 3 corresponds to the third voltage $V_3$ 253 generated across third capacitor C3 252 of FIG. 2, and the drive signal $U_{DR}$ 328 of FIG. 3 corresponds to the drive signal $U_{DR}$ 228 generated by comparator 254 of frequency to on-time converter 238 of FIG. 2 and/or the drive signal $U_{DR}$ 128 generated by the frequency to on-time converter 138 of FIGS. 1A and 1B. As shown, the request periods $T_{REQ}$ 357 between request events 337 get subsequently smaller. The shorter periods $T_{REQ}$ (i.e., faster frequency $f_{REQ}$) result in longer on-times $T_{ON}$ 356 for the drive signal $U_{DR}$ 328.

In the example depicted in FIG. 3, the first voltage $V_1$ 343 is a sawtooth waveform that is reset at the beginning of each request period $T_{REQ}$ 357 and then ramped up from substantially zero volts in response to each request event 337 of the request signal $U_{REQ}$ 236. The slope of the first voltage $V_1$ 343 is proportional to the current $I_1$ 244 and the capacitance C1 242 of FIG. 2. The second voltage $V_2$ 348 is sampled and held by the sample and hold circuit as described above in FIG. 2. As shown in FIG. 3, the second voltage $V_2$ 348 is sampled and held at the leading edge of each request event 337. The second voltage $V_2$ 348 is then received by the voltage-controlled current source 249 to generate the second current $I_2$ 350. In the depicted example, the third voltage $V_3$ 353 generated across the third capacitor C3 252 is a sawtooth waveform that is reset in response to each request event 337 at the beginning of each request period $T_{REQ}$ 357, and then charged in response to the second current $I_2$ 350 to generate the third voltage $V_3$ 353. The slope of the third voltage $V_3$ 353 is proportional to the current $I_2$ 350 and the capacitance C3 252 of FIG. 2. As shown, the second current $I_2$ 350 increases as the second voltage $V_2$ 348. As such, the slope of voltage $V_3$ 353 is greater as the second voltage $V_2$ 348 increases. Or in other words, the slope of voltage $V_3$ 353 is slower as the second voltage $V_2$ 348 decreases. As shown in the example, the beginning and end of each on-time $T_{ON}$ 356 pulse of the drive signal $U_{DR}$ 328 occurs in response to a comparison by comparator 254 of the third voltage $V_3$ 353 and the reference voltage VREF 355. In particular, the beginning of an on-time $T_{ON}$ 356 pulse of the drive signal $U_{DR}$ 328 occurs when third voltage $V_3$ 353 is reset and is therefore less than the reference voltage VREF 355, and the end of the on-time $T_{ON}$ 356 pulse of the drive signal $U_{DR}$ 328 occurs when third voltage $V_3$ 353 is greater than the reference voltage VREF 355.

The on-time $T_{ON}$ 356 during a current cycle is determined by the duration of the request period $T_{REQ}$ 357 in the previous cycle. The request period $T_{REQ}$ 357 is determined by measuring the duration between an edge of the received request pulse 337 in the previous cycle and the same corresponding edge of the received request pulse 337 in the current cycle. As shown in FIG. 3, the on-time $T_{ON}$ 356 for the second cycle is determined by the request period $T_{REQ}$ 357 of the first cycle and the time between the first request pulse 337 and the second request pulse 337 determines the on-time $T_{ON}$ 356 for the second cycle. Similarly, the on-time $T_{ON}$ 356 of the third cycle is determined by the request period $T_{REQ}$ 357 of the second cycle (time between the second request pulse 337 and the third request pulse 337). As shown, the request period $T_{REQ}$ 357 of the second cycle is shorter than the request period $T_{REQ}$ 357 in the first cycle and the second voltage $V_2$ 348 at the end of second cycle is smaller than the second voltage $V_2$ 348 at the end of the first cycle. As such, the slope of the third voltage $V_3$ 353 (i.e., second current $I_2$ 350) during the third cycle is slower than the slope of the third voltage $V_3$ 353 (i.e., second current $I_2$ 350) in the previous cycle. The resultant on-time $T_{ON}$ 356 in the third cycle is longer than the on-time $T_{ON}$ 358 in the second cycle. Further, the on-time $T_{ON}$ 356 of the fourth cycle is determined by the request period $T_Q$ 357 of the third cycle (time between the third request pulse 337 and the fourth request pulse 337). The request period $T_{REQ}$ 357 for the third cycle is shorter than the request period $T_{REQ}$ 357 of the second cycle and the second voltage $V_2$ 348 at the end of third cycle is smaller than the second voltage $V_2$ 348 at the end of the second cycle. As such, the slope of the third voltage $V_3$ 353 (i.e., second current $I_2$ 350) during the fourth cycle is slower than the slope of the third voltage $V_3$ 353 (i.e., second current $I_2$ 350) in either the second or third cycle. The resultant on-time $T_{ON}$ 356 in the fourth cycle is longer than the on-time $T_{ON}$ 358 in the second or third cycle.

Figure 4A:
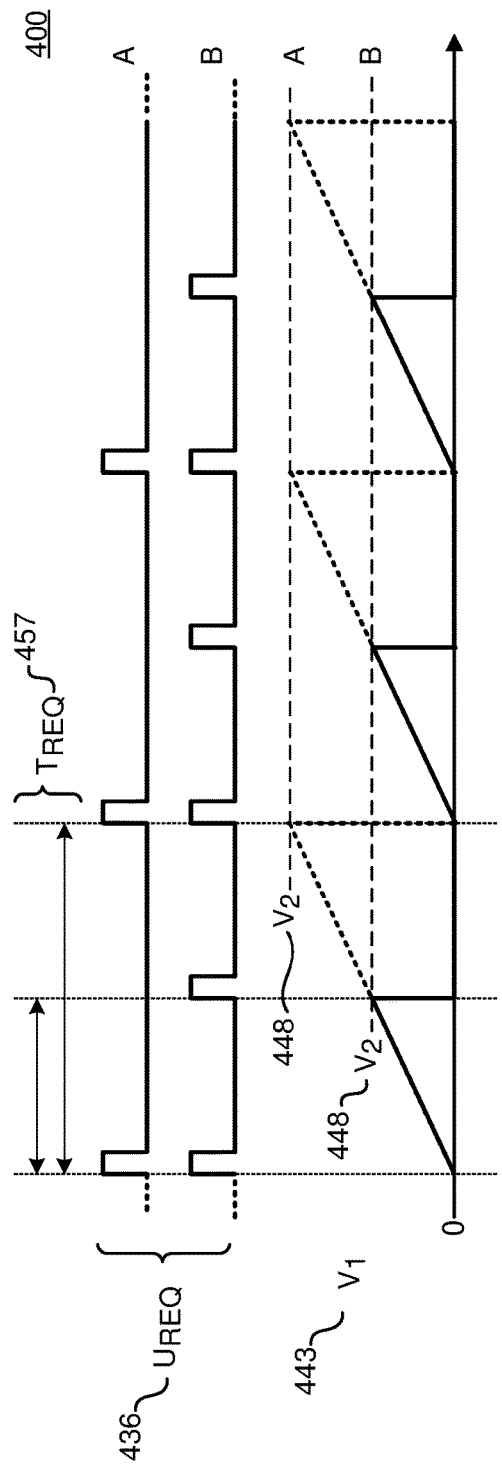
FIG. 4A is a timing diagram illustrating various example request signals and resulting first voltages of FIGS. 2 and 3 in accordance with an embodiment of the disclosure.

FIG. 4A is another timing diagram 400 illustrating various example request signals $U_{REQ}$ 436, and resulting first voltages $V_1$ 443 in accordance with an embodiment of the disclosure. In one example, it is appreciated that waveforms of FIG. 4A may correspond to examples of waveforms appearing in FIGS. 1A-3, and that similarly named or numbered elements described above may be coupled and function similarly below. As shown in the example depicted in FIG. 4A, example A of the request signal $U_{REQ}$ 436 has a longer request period $T_{REQ}$ 457 than the request period $T_Q$ 457 shown in example B of the request signal $U_{REQ}$ 436. As a result, there is a greater duration of time for the first current source $I_1$ 244 to charge first capacitor C1 242 (in FIG. 2) between request events of the request signal $U_{REQ}$ 436 and the second voltage $V_2$ 448 reaches a greater value across second capacitor C2 247 in example A as compared to example B. In this example, there is a longer request period $T_Q$ 457 (or a slower frequency $f_{REQ}$) in example A compared to what is shown in example B, which has a shorter request period $T_{REQ}$ 457 (or faster frequency $f_{REQ}$). In other words, the second voltage $V_2$ 448 increases as the duration of the request period $T_{REQ}$ 457 of the request events in the request signal $U_{REQ}$ 436 increases.

Figure 4B:
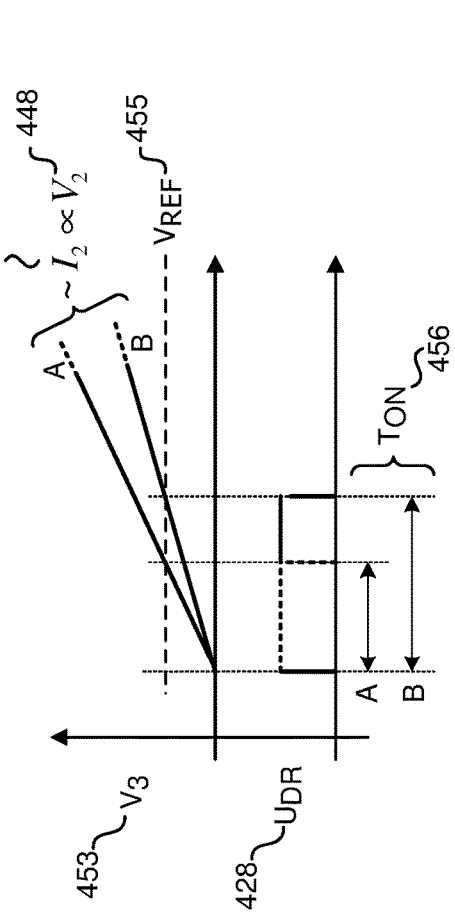
FIG. 4B is another timing diagram illustrating various example third voltages and resulting drive signal of FIGS. 2 and 3 in accordance with an embodiment of the disclosure.

FIG. 4B is yet another timing diagram 401 illustrating various example third voltages $V_3$ 453, and the resulting on-time $T_{ON}$ 456 pulse in drive signal $U_{DR}$ 428 in accordance with an embodiment of the disclosure. In one example, it is appreciated that waveforms of FIG. 4B may correspond to examples of waveforms appearing in FIGS. 1A-4A, and that similarly named or numbered elements described above may be coupled and function similarly below. As shown in the example depicted in FIG. 4B, the rate at which the third voltage $V_3$ 453 increases (i.e., the slope of the third voltage $V_3$ 453) is responsive to the voltage controlled second current $I_2$ 450, which is proportional to the second voltage $V_2$ 448. In one example, the magnitude of the voltage controlled second current $I_2$ 450 increases as the second voltage $V_2$ 448 increases. As such, the third voltage $V_3$ 453 increases at a faster rate if the second current $I_2$ 450 is larger, or in other words the third voltage $V_3$ 453 increases at a faster rate if second voltage $V_2$ 448 is larger. Thus, the duration of the pulses (on-time $T_{ON}$ 456) included in the primary drive signal $U_{DR}$ 428 increase in response to decreases in the duration of the request period $T_{REQ}$ 457 for the request signal $U_{REQ}$ 436. For instance, the resultant on-time $T_{ON}$ 456 of drive signal $U_{DR}$ 428 for example A is shorter than the on-time $T_{ON}$ 456 of drive signal $U_{DR}$ 428 for example B, where example A corresponds to an example in which the third voltage $V_3$ 453 is charged at a higher rate in response to the second current $I_2$ 450 having a greater magnitude due to a longer period $T_{REQ}$ 457 of the request signal $U_{REQ}$ 436.

Figure 5:
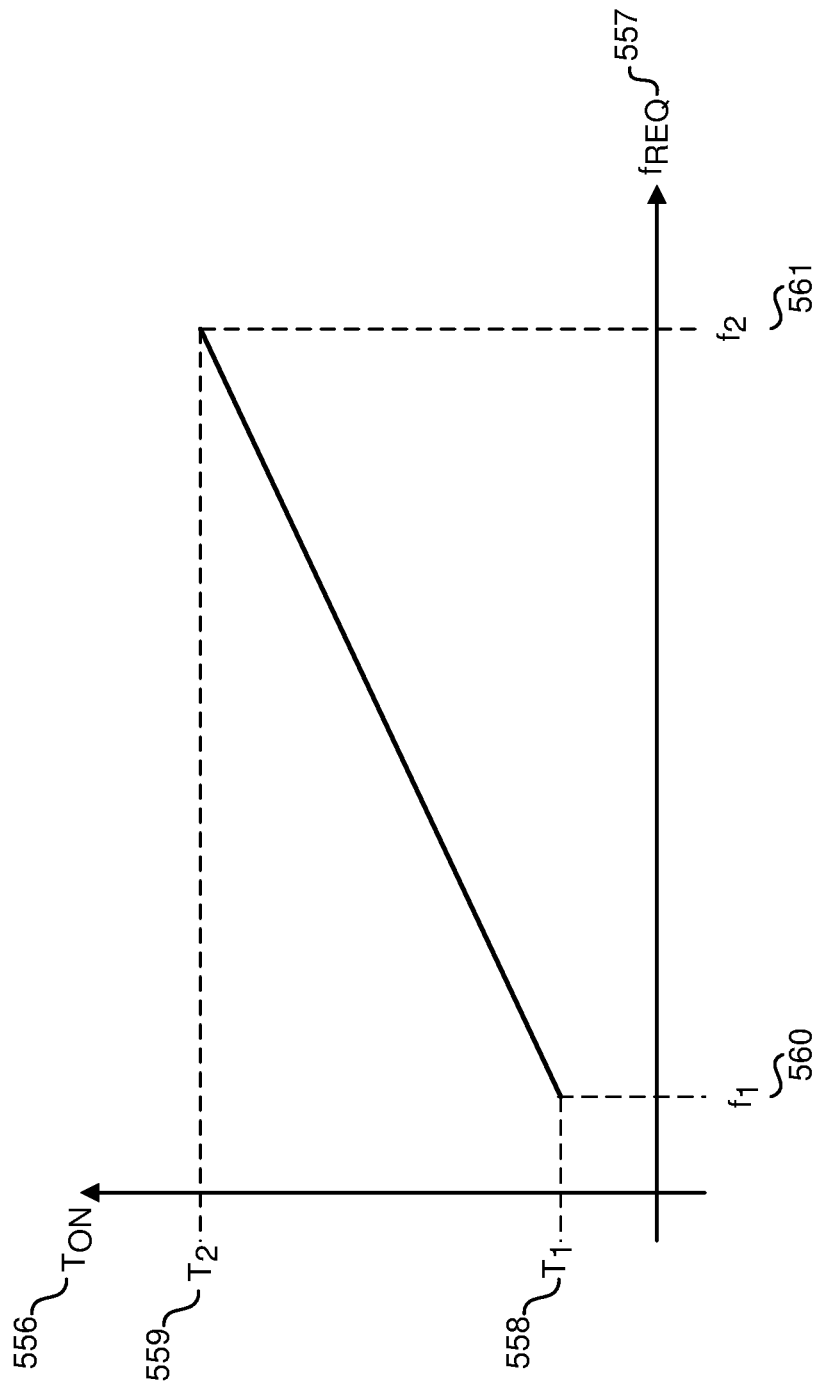
FIG. 5 is a graph illustrating the example relationship between the frequency of the request signal and the on-time of the drive signal of FIGS. 1A-2 in accordance with an embodiment of the disclosure.

FIG. 5 is a graph illustrating one example of the relationship between the frequency of the request signal and the on-time of the drive signal in accordance with an embodiment of the disclosure. In one example, it is appreciated that waveform of FIG. 5 may correspond to of waveforms appearing in FIGS. 1A-4B, and that similarly named or numbered elements described above may be coupled and function similarly below. As shown in the example depicted in FIG. 5, the on-times $T_{ON}$ 556 of the primary drive signal $U_{DR}$ 428 has a one-to-one relationship with the frequency $f_{REQ}$ 557 of request events the request signal $U_{REQ}$ 436. In the example shown, the on-time $T_{ON}$ 556 increases linearly with respect to the frequency $f_{REQ}$ 557 of request events. Stated in another way, the on-times $T_{ON}$ 556 duration of pulses (on-times $T_{ON}$ 556) included in the primary drive signal $U_{DR}$ 428 increase linearly in response to decreases in the period $T_{REQ}$ 457 of request events the request signal $U_{REQ}$ 436. Further, the on-time $T_{ON}$ 556 for a given frequency $f_{REQ}$ 557 is less than the period $T_{REQ}$ 457 (i.e., $1/f_{REQ}$). Although a linear relationship is shown, it should be appreciated that other one-to-one relationships may be used (such as an exponential relationship). The frequency $f_{REQ}$ 557 ranges from $f_1$ 560 to $f_2$ 561 and the corresponding on-time $T_{ON}$ 556 ranges from a value $T_1$ 558 to $T_2$ 559. In one example, the frequency may range from 25 Hz-100 kHz while the on-time $T_{ON}$ 556 may range from 700 ns-6.5 us.

The above description of illustrated examples of the present invention, including what is described in the Abstract, are not intended to be exhaustive or to be limitation to the precise forms disclosed. While specific embodiments of, and examples for, the invention are described herein for illustrative purposes, various equivalent modifications are possible without departing from the broader spirit and scope of the present invention. Indeed, it is appreciated that the specific example voltages, currents, frequencies, power range values, times, etc., are provided for explanation purposes and that other values may also be employed in other embodiments and examples in accordance with the teachings of the present invention.

What is claimed is:

1. A method of converting power using a power converter comprising a primary controller and a secondary controller, the method comprising:
    receiving a feedback signal at the secondary controller, the feedback signal representative of an output of the power converter;
    generating a request signal in response to the feedback signal;
    receiving the request signal at the primary controller;
    generating a primary drive signal in response to the request signal;
    controlling a power switch at an input of the power converter with the primary drive signal; and
    controlling a duration of an on-time pulse of the primary drive signal, controlling the duration comprising:
        determining the duration of the on-time pulse in response to a period of the request signal from a previous cycle; and
        using a frequency to on-time converter.

2. The method of claim 1, wherein the power converter is a power factor corrected power converter.

3. The method of claim 1, wherein the duration of the on-time pulse of the primary drive signal decreases as the period of the request signal increases.

4. The method of claim 1, further comprising:
    receiving an input voltage at the input of the power converter.

5. The method of claim 4, wherein the duration of the on-time pulse of the primary drive signal varies over a line cycle of the input voltage.

6. The method of claim 1, wherein the input of the power converter is galvanically isolated from the output of the power converter, and wherein the primary controller is galvanically isolated from the secondary controller.

7. The method of claim 6, wherein receiving the request signal at the primary controller comprises:
    receiving the request signal at the primary controller through a communication link from the secondary controller.

8. The method of claim 1, wherein the primary controller is included in a first semiconductor die, wherein the secondary controller is included in a second semiconductor die, and wherein the first semiconductor die is separate from the second semiconductor die.

9. The method of claim 8, wherein the first semiconductor die and the second semiconductor die are included in a single package.

10. The method of claim 1, wherein controlling the duration of the on-time pulse of the primary drive signal comprises:
    generating a first voltage in response to the request signal using a first integrator;
    generating a second voltage using a sample and hold circuit in response to the first voltage and the request signal;
    generating a voltage controlled current in response to the second voltage;
    generating a third voltage in response to the voltage controlled current using a second integrator; and
    generating the primary drive signal in response to a comparison of the third voltage and a reference voltage.

11. The method of claim 10, wherein an end of the on-time pulse of the primary drive signal is responsive to the comparison of the third voltage and the reference voltage.

12. The method of claim 10, wherein the second voltage increases as the period of the request signal increases.

13. The method of claim 10, wherein the voltage controlled current increases as the second voltage increases.

14. A method of controlling a power switch at an input of a power converter, the method comprising:
    receiving a feedback signal representative of an output of the power converter;
    providing a request signal in response to the feedback signal;
    controlling the power switch with a primary drive signal in response to the request signal; and
    controlling a duration of an on-time pulse of the primary drive signal, controlling the duration comprising:
        determining the duration of the on-time pulse in response to a period of the request signal from a previous cycle; and
        using a frequency to on-time converter.

15. The method of claim 14, wherein receiving the feedback signal representative of the output of the power converter comprises:

receiving the feedback signal at a secondary controller.

16. The method of claim 15, wherein providing the request signal in response to the feedback signal comprises:

providing the request signal to a primary controller galvanically isolated from the secondary controller.

17. The method of claim 14, wherein controlling the duration of the on-time pulse of the primary drive signal further comprises:

generating a first voltage in response to the request signal using a first integrator;

generating a second voltage using a sample and hold circuit in response to the first voltage and the request signal;

generating a voltage controlled current in response to the second voltage;

generating a third voltage in response to the voltage controlled current using a second integrator; and generating the primary drive signal in response to a comparison of the third voltage and a reference voltage.

18. The method of claim 17, wherein an end of the on-time pulse of the primary drive signal is responsive to the comparison of the third voltage and the reference voltage;

wherein the second voltage increases as the period of the request signal increases; and wherein the voltage controlled current increases as the second voltage increases.

* * * * *